United States Patent
Bun et al.

(10) Patent No.: US 7,033,405 B2
(45) Date of Patent: Apr. 25, 2006

(54) LITHIUM SECONDARY BATTERY AND METHOD FOR MANUFACTURING THEREOF

(75) Inventors: Yeong-Chan Bun, Cheonan (KR); Kyu-Woong Cho, Gwungmyung (KR)

(73) Assignee: Samsung SDI Co., Ltd., Suwon-si (KR)

( * ) Notice: Subject to any disclaimer, the term of this patent is extended or adjusted under 35 U.S.C. 154(b) by 235 days.

(21) Appl. No.: 10/200,153

(22) Filed: Jul. 23, 2002

(65) Prior Publication Data
US 2003/0054242 A1 Mar. 20, 2003

(30) Foreign Application Priority Data
Sep. 15, 2001 (KR) ............................... 2001-57010

(51) Int. Cl.
*H01M 2/02* (2006.01)
(52) U.S. Cl. ..................................... 29/623.2; 429/185
(58) Field of Classification Search ............... 29/623.2; 429/127, 185
See application file for complete search history.

(56) References Cited

U.S. PATENT DOCUMENTS

| | | | | |
|---|---|---|---|---|
| 6,145,280 | A * | 11/2000 | Daroux et al. | 53/433 |
| 6,485,862 | B1 * | 11/2002 | Yoshioka et al. | 429/127 |
| 6,521,382 | B1 * | 2/2003 | Song et al. | 429/309 |

FOREIGN PATENT DOCUMENTS

| JP | 63048778 A | * | 3/1988 |
|---|---|---|---|
| JP | 02-72566 | | 3/1990 |
| JP | 02072566 A | * | 3/1990 |
| JP | 05-054910 | | 5/1993 |
| JP | 2000182599 A | * | 6/2000 |
| JP | 2000-251941 | | 9/2000 |
| JP | 2001283916 A | * | 10/2001 |
| KR | 10-0274097 | | 12/2000 |
| WO | WO 00/41263 | | 7/2000 |

OTHER PUBLICATIONS

Korean Notice to Submit Response issued by the Korean Intellectual Property Office on Feb. 27, 2004, and English translation.
Chinese Office Action of the Chinese Patent Application No. 02142790.9, issued on May 13, 2005 (English translation attached).
Korean Notice to submit response issued by the Korean Intellectual Property Office on May 22, 2003, and English translation.

* cited by examiner

*Primary Examiner*—Gregg Cantelmo
(74) *Attorney, Agent, or Firm*—Robert E. Bushnell, Esq.

(57) ABSTRACT

A lithium secondary battery and a method for manufacturing the lithium secondary battery includes the forming of an electrode assembly by interposing a separator between a positive electrode and a negative electrode, accommodating the electrode assembly into a battery case, injecting an electrolytic solution into the battery case, and forming the battery. The act of sealing the battery is by reducing the internal pressure of the battery to be maintained at a certain range of pressure for a certain period of time, is further provided after injecting an electrolytic solution or after forming the battery. The lithium second battery can prevent deformation of an external shape of a battery due to swelling under a high-temperature condition and can prevent deterioration in performance of a battery.

11 Claims, 1 Drawing Sheet

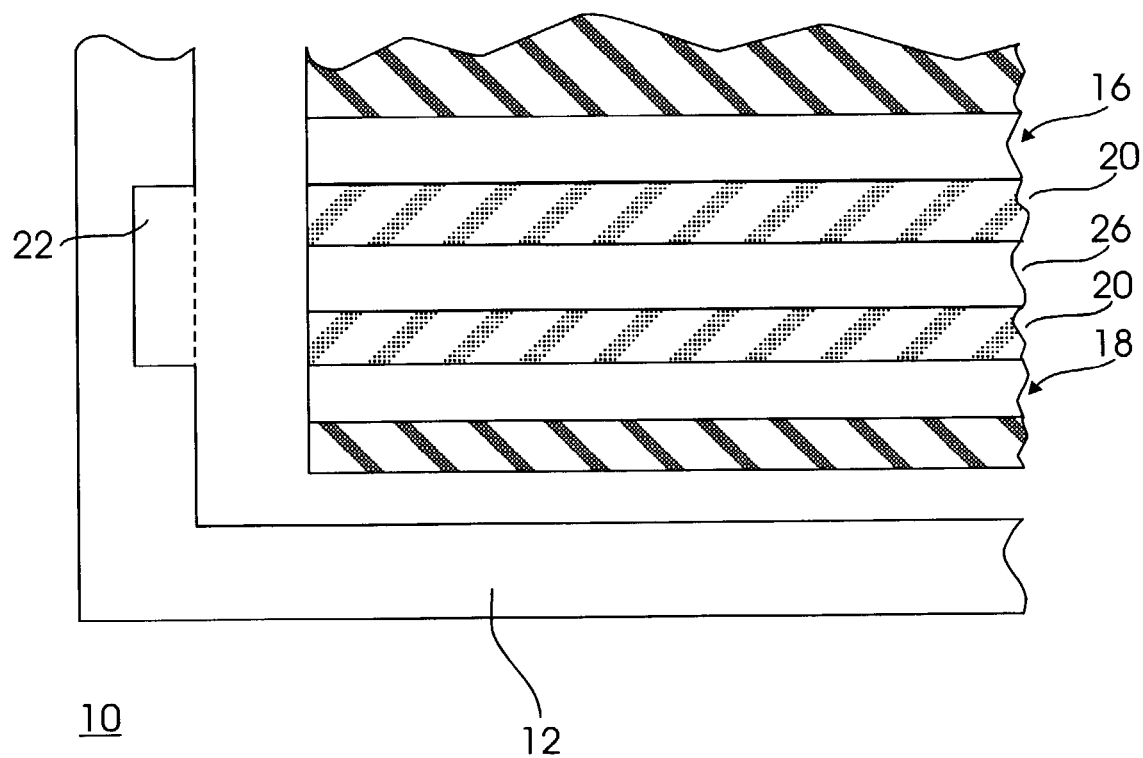

LITHIUM SECONDARY BATTERY AND METHOD FOR MANUFACTURING THEREOF

CLAIM OF PRIORITY

This application makes reference to, incorporates the same herein, and claims all benefits accruing under 35 U.S.C. §119 from an application for METHOD FOR MANUFACTURING LITHIUM BATTERY earlier filed in the Korean Industrial Property Office on 15 Sep. 2001 and there duly assigned Ser. No. 2001-57010.

BACKGROUND OF THE INVENTION

1. Field of the Invention

The present invention relates to a secondary battery, and more particularly, to a lithium secondary battery which can prevent deformation of an external shape of a battery due to swelling under a high-temperature condition and can prevent deterioration in performance of a battery, and a method for manufacturing thereof.

2. Description of the Related Art

Lithium batteries capable of charging and discharging, in general, are being vigorously studied along with the development of portable electronic devices such as cellular phones, notebook-type computers or camcorders. There are various kinds of secondary batteries, including nickel-cadmium (Ni—Cd) batteries, nickel-metal hydride (Ni-MH) batteries, lithium ion batteries, lithium polymer batteries, lithium-metal secondary batteries, zinc-air storage batteries and so on. Specifically, lithium secondary batteries are rapidly developing because of their longlasting lifetime characteristics, that is, approximately 3 times the lifetime characteristics of nickel-cadmium (Ni—Cd) batteries or nickel-metal hydride (Ni-MH) batteries used to supply power to electronic devices, and their excellent energy densities per unit weight. Lithium secondary batteries can be classified into liquid electrolyte batteries and solid electrolyte batteries according to the kind of electrolyte used. In general, a battery using a liquid electrolyte is referred to as a lithium-ion battery, and a battery using a polymeric electrolyte is referred to as a lithium polymer battery.

In the manufacture of a lithium secondary battery, a positive electrode current collector and a negative electrode current collector are first coated with a material prepared by mixing each electrode active material, a binder and a plasticizer, to form a positive and a negative electrode sheet. Then, the positive and the negative electrode sheet are stacked or wound on both sides of a separator to form a positive-negative electrode assembly (jelly-roll) having a predetermined shape, followed by inserting the jelly-roll into a battery case, thereby completing a battery.

In the case of a lithium secondary battery prepared by employing a volatile electrolytic solution, the internal pressure of the battery abnormally increases due to an increase in volume of a closed battery and evaporation of an electrolytic solution under a high-temperature condition of 60° C. (Celsius) or higher, resulting in the swelling of the battery. Thus, the battery undergoes deformation in external shape. Also, electrode sheets of the battery are adversely affected in adhesiveness, which lowers the utilization efficiency of the electrode sheets during an electrochemical reaction, resulting in deterioration in battery performance. It is known that the following factors give rise to swelling of a lithium secondary battery occurring when the battery is exposed to a high-temperature condition: (1) a vigorous reaction between active materials and an electrolytic solution at high temperature; (2) an increase in vapor pressure due to evaporation of an electrolytic solution at high temperature; and (3) the content of moisture in a battery.

Korean registered patent publication No. 10-274097 for Method for Manufacturing a Lithium Ion Polymer Battery discloses removal of impurity-containing air by evacuating a battery pack before injecting an electrolytic solution into the battery pack, which is performed as only a part of injecting the electrolytic solution into the battery back.

As described above, a pressure reducing step has not been conventionally adopted. Otherwise, the pressure reduction step has been partially adopted in the step of injecting an electrolytic solution or sealing followed by an initial formation process of a battery, or in the step of degassing after the initial formation process. However, a pressure reducing effect is not noticeable. The pressure reducing effect is only enough to confirm by the naked eye that the pressure is subatmospheric. Thus, problems with the prior art, including volume expansion of a battery kept at high temperature or deterioration in battery performance, cannot be overcome.

SUMMARY OF THE INVENTION

It is therefore, an object of the present invention to provide a lithium battery which can noticeably prevent a battery from becoming bulky, and a method for manufacturing the lithium battery.

It is another object to provide a lithium battery which even if exposed to high-temperature conditions, the external deformation of the battery due to swelling can be greatly improved.

It is yet another object to provide a lithium battery that can prevent the deterioration of battery performance because of external conditions.

To accomplish the above and other objects, there is a method for manufacturing a lithium secondary battery including forming an electrode assembly by interposing a separator between a positive electrode and a negative electrode, accommodating the electrode assembly into a battery case, injecting an electrolytic solution into the battery case, and forming the battery, wherein the step of sealing the battery by reducing the internal pressure of the battery to be maintained at 20 kPa (kilo-Pascal) to 1000 Pa (Pascal) for 10 to 100 seconds, is further provided after injecting an electrolytic solution or after forming the battery.

According to an embodiment of the present invention, the method may further include removing the gas generated during the forming step by providing a gas chamber integrally formed with the battery case.

Alternatively, the method may further include sealing the battery by reducing the internal pressure of the battery to be maintained at 20 kPa to 1000 Pa for 10 to 100 seconds, is further is provided in the step of removing gas.

Also, the present invention provides a lithium secondary battery prepared by the above-described method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a sectional view of a portion of an example of a lithium battery manufactured by the method according to a preferred embodiment of the present invention.

DETAILED DESCRIPTION OF THE PREFERRED EMBODIMENTS

The present invention will now be described in detail.

Referring to FIG. 1, the present invention is directed to a method for manufacturing a battery 10 using a battery case 12 formed of a metal can or a casing material for forming polymer layers on inner and outer surfaces of a metal foil, the method including injecting a power-generating element including a positive electrode 16, a negative electrode 18 and an electrolyte 20, into the battery case 12, reducing the internal pressure of the battery case 12 to be subatmospheric, hermetically sealing the battery case 12 and maintaining the internal pressure of the battery 10 at a subatmospheric state. The structure of the lithium battery of FIG. 1 is an example. Other structures for the lithium battery are also capable of accommodating the method for manufacturing the lithium battery according to the preferred embodiment of the present invention.

As described above, in the case of a lithium secondary battery prepared by employing a volatile electrolytic solution, the internal pressure of the battery abnormally increases due to an increase in volume of a closed battery and evaporation of an electrolytic solution under a high-temperature condition of 60° C. (Celsius) or higher, resulting in the swelling of the battery. Thus, the battery undergoes deformation in external shape. Also, electrode sheets of the battery are adversely affected in adhesiveness, which lowers the utilization efficiency of the electrode sheets during an electrochemical reaction, and makes electrochemical migration of lithium ions difficult, resulting in deterioration in battery performance.

In general, if the pressure of a closed space is 20 kPa to 1000 Pa, which is lower than the atmosphere, the volume of the closed space is reduced down to $1/10$ to $1/1000$ times. This principle can be applied to a battery. That is, even if the volume occupied by the battery is constant, deformation of the external shape of the battery arising due to swelling when the battery is exposed to a high-temperature environment of 60° C. or higher, can be noticeably suppressed.

The internal pressure of the battery 10 according to the present invention is preferably in the range of 20 kPa to 1000 Pa, more preferably in the range of 15 kPa to 5 kPa. If the internal pressure of a battery is greater than or equal to 20 kPa, the effect of preventing swelling of the battery is negligible. If the internal pressure of a battery is less than 1 kPa, several processing problems may be encountered, including quite a long time for pressure reduction and volatilization of an electrolytic solution.

A time for a pressure reducing process adopted in the present invention is preferably in the range of 10 to 100 seconds. If the time is shorter than 10 seconds, the pressure reducing effect is negligible. If the time is longer than 100 seconds, a large amount of the electrolytic solution may undesirably volatilize.

In the present invention, a gas chamber 22 is connected to a battery case 12. Gas generated during a formation process is drawn to the gas chamber 22, followed by sealing and cutting the gas chamber 22.

For a better understanding of the invention, the present invention will now be explained by way of examples and not by way of limitation.

EXAMPLE 1

1-(1) Materials used

LiMn$_2$O$_4$ (LM4 available from Nikki Chemical Co., Ltd., Japan) was used as a positive electrode active material, Super-P (MMM carbon, Belgium) was used as a conductive material for the positive electrode 16, and KMFC (Furukawa, Japan) was used as a negative electrode material 18. An electrolyte 20 used was prepared by mixing ethylene carbonate (EC), dimethyl carbonate (DEC) and propylene carbonate (PC) in a volume ratio of 41:49:10 and adding LiPF$_6$ (Hashimoto Chemical Co., Ltd.) thereto to produce a 1.3 M solution. A binder for the positive electrode 16 was polyvinylidenefluoride (PVdF) (KW 1300 available from Kurea Co., Ltd., Japan), and a binder for the negative electrode 18 was PVdF (KW 1100 available from Kurea Co., Ltd., Japan). A pouch used had a thickness of 110 μm (microns) and was constructed of triple layers of chlorinated polypropylene (CPP), an Al (aluminum) foil and nylon, sequentially stacked from the center of the pouch. A separator 26 used was polypropylene.

1-(2) Preparation of battery

A positive electrode active material, a conductive agent and a binder were sufficiently mixed in a binder solution containing 8% by weight of a binder dissolved in a N-methyl pyrrolidone (NMP) solvent, in a weight ratio of 93:3:4, using a planetary mixer to prepare a positive electrode sheet coated in a loading amount of 54.0 mg/cm$^2$ (milligrams per centimeters squared) using a coater. Then, a negative electrode active material and a binder were mixed in a weight ratio of 92:8 in a binder solution containing 10% by weight of a binder dissolved in an NMP solvent to prepare a negative electrode sheet coated in a loading amount of 17.4 mg/cm$^2$.

The coated sheets were rolled at densities of 2.79 g/cm$^3$ and 1.64 g/cm$^3$ (grams per centimeters cubed), respectively, using a roll-mill, followed by cutting, drying the negative electrode sheet, winding (using a prismatic-type winding device, inserting, injecting an electrolytic solution and fusing a battery case, and finally preparing a desired battery. The thus-prepared battery was stabilized, and then a formation process for identifying and grading the capacity of the battery was carried out by repeatedly performing charging and discharging. The gas generated after the initial formation process was removed by a gas chamber 22 integrally formed with the battery case 12. Then, the battery case 12 was resealed while reducing the pressure over 50 seconds under reduced pressure of 20 kPa, thereby completing the battery 10.

EXAMPLE 2

A battery 10 was prepared in the same manner as in Example 1 except that the reduced pressure was 10 kPa.

EXAMPLE 3

A battery 10 was prepared in the same manner as in Example 1 except that the reduced pressure was 5 kPa.

EXAMPLE 4

A battery 10 was prepared in the same manner as in Example 1 except that the pressure reducing process was performed immediately after the step of injecting an electrolytic solution 20.

EXAMPLE 5

A battery 10 was prepared in the same manner as in Example 1 except that the pressure reducing process was performed before the degassing step and immediately after the step of injecting an electrolytic solution 20.

COMPARATIVE EXAMPLE

A battery was prepared in the same manner as in Example 1 except that the pressure reducing process was not performed.

Test

Swelling tests were performed on the batteries prepared in Examples 1 through 5 and the Comparative Example at a high temperature of 80° C., and the test results are shown in Table 1. Swelling extents denoted by numbers listed in Table 1 are based on comparison of thicknesses of the batteries tested with the thickness of a battery which is not exposed to a high-temperature condition of 80° C.

TABLE 1

|  | Time elapsed (hr) | | | |
| --- | --- | --- | --- | --- |
|  | 1 | 2 | 3 | 4 |
| Example 1 | 4 | 9.1 | 12 | 15 |
| Example 2 | 2.3 | 4.5 | 6.8 | 9.9 |
| Example 3 | 2.2 | 4.3 | 6.6 | 9.5 |
| Example 4 | 2.5 | 4.7 | 6.8 | 9.8 |
| Example 5 | 2.2 | 4.4 | 6.3 | 9.1 |
| Comparative Example | 12.2 | 16.1 | 19.8 | 23.2 |

Additional tests exhibited no effective data in the pressure range of over 20 kPa. Also, at a pressure of 1 kPa or less, it took a long time to reduce the pressure and the electrolytic solution was susceptible to volatilization.

As described above, in the lithium secondary battery 10 according to the present invention, even if the battery 10 is exposed to a high-temperature condition of 60° C. or higher, external deformation of the battery 10 due to swelling can be greatly improved. Therefore, deterioration of battery performance can be prevented.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for manufacturing a lithium secondary battery, comprising:
    forming an electrode assembly by interposing a separator between a positive electrode and a negative electrode;
    accommodating said electrode assembly into a battery case;
    injecting an electrolytic solution into said battery case;
    initially forming said lithium secondary battery by sealing said battery case;
    removing gas generated by providing a gas chamber integrally formed with said battery case, with gas generated during said forming of said lithium battery being drawn to the gas chamber;
    sealing and cutting the gas chamber; and
    resealing said lithium secondary battery by reducing the internal pressure of said lithium secondary battery to be maintained at 20 kPa to 1000 Pa for 10 to 100 seconds being provided after injecting said electrolytic solution or after forming said lithium secondary battery.

2. The method according to claim 1, further comprising removing the gas generated during said initial forming step by providing a gas chamber integrally formed with said battery case and the gas chamber being separate from a chamber of the battery case accommodating the gas.

3. The method according to claim 2, further comprising sealing said lithium secondary battery by reducing the internal pressure of said lithium secondary battery to be maintained at 20 kPa to 1000 Pa for 10 to 100 seconds, is further provided in said step of removing gas.

4. The method according to claim 1, with the internal pressure of said lithium secondary battery to be maintained at 15 kPa to 5 kPa.

5. A method for manufacturing a lithium secondary battery, comprising:
    forming an electrode assembly by interposing a separator between a positive electrode and a negative electrode;
    accommodating said electrode assembly into a battery case;
    injecting an electrolytic solution into said battery case;
    forming said lithium secondary battery;
    removing gas generated during said forming step of said lithium secondary battery by providing a gas chamber integrally formed with said battery case, with gas generated during said forming of said lithium battery being drawn to the gas chamber;
    sealing and cutting the gas chamber; and
    sealing said lithium secondary battery while reducing the internal pressure of said lithium secondary battery to be maintained at 20 kPa to 1000 Pa for a predetermined period of time.

6. The method according to claim 5, with the predetermined period of time being in a range from 10 to 100 seconds.

7. The method according to claim 6, with said step of sealing said lithium secondary battery while reducing the internal pressure of said lithium secondary battery being provided immediately after injecting said electrolytic solution.

8. The method according to claim 6, with said step of sealing said lithium secondary battery while reducing the internal pressure of said lithium secondary battery being provided after forming said lithium secondary battery.

9. The method according to claim 5, with said step of sealing said lithium secondary battery while reducing the internal pressure of said lithium secondary battery being provided in said step of removing gas.

10. The method according to claim 6, with the internal pressure of said lithium secondary battery to be maintained at 15 kPa 5 kPa, and reducing the pressure being performed before removing the gas with the gas chamber and immediately after injecting said electrolytic solution.

11. A method for manufacturing a lithium secondary battery, comprising:
    injecting an electrolytic solution into a battery case;
    forming said lithium secondary battery including fusing said battery case;
    removing gas generated during said forming of said lithium secondary battery by providing a gas chamber integrally formed with said battery case and the gas chamber being distinct from a chamber accommodating the gas in said battery case; and
    sealing said lithium secondary battery while reducing the internal pressure of said lithium secondary battery to be maintained at 20 kPa to 1000 Pa for 10 to 100 seconds after injecting said electrolytic solution or after forming said lithium secondary battery.

* * * * *

UNITED STATES PATENT AND TRADEMARK OFFICE
CERTIFICATE OF CORRECTION

PATENT NO. : 7,033,405 B2
APPLICATION NO. : 10/200153
DATED : April 25, 2006
INVENTOR(S) : Eun et al.

It is certified that error appears in the above-identified patent and that said Letters Patent is hereby corrected as shown below:

On title page Item (75) please delete and insert:
Eun, Yeong-Chan, and
Cho, Kyu-Woong Signed and Sealed this Eighth Day of August, 2006

JON W. DUDAS
*Director of the United States Patent and Trademark Office*